United States Patent
Tsai (10) Patent No.: US 12,294,292 B2
(45) Date of Patent: May 6, 2025

(54) POWER CONVERTER HAVING FEEDBACK VOLTAGE ADJUSTING MECHANISM FOR NEGATIVE VOLTAGE

(71) Applicant: ANPEC ELECTRONICS CORPORATION, Hsinchu (TW)

(72) Inventor: Ming-Liang Tsai, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 262 days.

(21) Appl. No.: 18/314,790

(22) Filed: May 9, 2023

(65) Prior Publication Data

US 2024/0223072 A1    Jul. 4, 2024

(30) Foreign Application Priority Data

Dec. 28, 2022   (TW) .................................. 111150251

(51) Int. Cl.
  *H02M 1/32*    (2007.01)
  *H02M 1/00*    (2006.01)
  *H02M 3/158*   (2006.01)

(52) U.S. Cl.
  CPC ........... *H02M 1/32* (2013.01); *H02M 1/0003* (2021.05); *H02M 3/158* (2013.01)

(58) Field of Classification Search
  CPC ....... H02M 1/32; H02M 1/0003; H02M 3/158
  See application file for complete search history.

(56) References Cited

U.S. PATENT DOCUMENTS

| | | | | |
|---|---|---|---|---|
| 10,756,627 B2* | 8/2020 | Hsu | ........................ | H02M 3/158 |
| 2009/0237053 A1* | 9/2009 | Gan | ........................ | H02M 3/156 |
| | | | | 323/283 |
| 2009/0243580 A1* | 10/2009 | Chen | ...................... | H02M 3/156 |
| | | | | 323/288 |
| 2012/0161738 A1* | 6/2012 | Nakashima | ........... | H02M 3/158 |
| | | | | 323/284 |
| 2012/0217941 A1* | 8/2012 | Chen | ...................... | H02M 3/156 |
| | | | | 323/271 |
| 2013/0049717 A1* | 2/2013 | Mizutani | ............... | H02M 3/156 |
| | | | | 323/271 |
| 2013/0108081 A1* | 5/2013 | Ozaki | .................... | H03F 1/0211 |
| | | | | 330/251 |
| 2013/0342027 A1* | 12/2013 | Tsai | ........................ | H02J 50/12 |
| | | | | 307/104 |
| 2022/0060108 A1* | 2/2022 | Hashim | ................. | H02M 3/157 |
| 2023/0208299 A1* | 6/2023 | Chen | ....................... | H02M 1/08 |
| | | | | 323/271 |

* cited by examiner

*Primary Examiner* — Rafael O De Leon Domenech
(74) *Attorney, Agent, or Firm* — Li & Cai Intellectual Property Office (57) ABSTRACT

A power converter having a feedback voltage adjusting mechanism for a negative voltage is provided. Input terminals of an operational amplifier are respectively connected to a zero voltage and a first terminal of a first resistor. A second terminal of the first resistor is connected to a second terminal of a low-side switch. A first current source is connected to an output terminal of the operational amplifier and a first terminal of a second resistor. A second terminal of the second resistor is connected to the first terminal of the first resistor. The first current source outputs a first current according to a signal output by the operational amplifier. A second current source outputs a second current being m times the first current and is connected to a first terminal of a third resistor. A voltage of the first terminal of the third resistor is a feedback voltage.

10 Claims, 6 Drawing Sheets

POWER CONVERTER HAVING FEEDBACK VOLTAGE ADJUSTING MECHANISM FOR NEGATIVE VOLTAGE

CROSS-REFERENCE TO RELATED PATENT APPLICATION

This application claims the benefit of priority to Taiwan Patent Application No. 111150251, filed on Dec. 28, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a feedback voltage adjusting mechanism for a negative voltage.

BACKGROUND OF THE DISCLOSURE

For an electronic device, a power converter is an indispensable device for adjusting power and supplying the adjusted power to the electronic device. A high-side switch and a low-side switch of the power converter are often switched according to data such as voltage or current of circuit components of the power converter, so that the power converter provides power to a load. However, for negative voltage applications, the switching control of the high-side switch and the low-side switch of the power converter is highly complex, such that it is difficult for the power converter to provide accurate over-voltage or under-voltage protection while switching voltages.

SUMMARY OF THE DISCLOSURE

In response to the above-referenced technical inadequacies, the present disclosure provides a power converter having a feedback voltage adjusting mechanism for a negative voltage. The power converter includes a high-side switch, a low-side switch, a control circuit, an error amplifier, and a feedback circuit. A first terminal of the high-side switch is connected to a common voltage. A first terminal of the low-side switch is connected to a second terminal of the high-side switch. A node between the first terminal of the low-side switch and the second terminal of the high-side switch is grounded through an inductance. A second terminal of the low-side switch is grounded. The control circuit is connected to a control terminal of the high-side switch and a control terminal of the low-side switch. A first input terminal of the error amplifier is coupled to a reference voltage. An output terminal of the error amplifier is connected to an input terminal of the control circuit. The feedback circuit includes an operational amplifier, a first resistor, a feedback modulation element, a second resistor and a third resistor. A first input terminal of the operational amplifier is coupled to an input voltage. A first terminal of the first resistor is connected to a second input terminal of the operational amplifier. A second terminal of the first resistor is connected to a second terminal of the low-side switch. The feedback modulation element is connected to an output terminal of the operational amplifier. The feedback modulation element is configured to determine a value of a first current according to an operational amplification signal output by the operational amplifier and output the first current. The feedback modulation element is configured to output a second current. A value of the second current is m times the value of the first current, and m depends on a fixed ratio of the reference voltage to the output voltage. The first terminal of the second resistor is connected to the feedback modulation element to receive the first current. A second terminal of the second resistor is connected to the first terminal of the first resistor. A first terminal of the third resistor is connected to the feedback modulation element to receive the second current and connected to a second input terminal of the error amplifier. A second terminal of the third resistor is grounded.

In certain embodiments, the input voltage is a zero voltage.

In certain embodiments, the feedback modulation element includes a first current source and a second current source. The first current source is connected to the output terminal of the operational amplifier and the first terminal of the second resistor. The first current source is configured to output the first current to the second resistor according to the operational amplification signal. The second current source is connected to the first current source and the first terminal of the third resistor. The second current source outputs the second current m times the first current to the third resistor.

In certain embodiments, the first current source is coupled to a first voltage.

In certain embodiments, the second current source is coupled to the first voltage.

In certain embodiments, the power converter having a feedback voltage adjusting mechanism for a negative voltage further includes a sensor capacitor. A first terminal of the sensor capacitor is connected to the second terminal of the low-side switch and the second terminal of the first resistor. A second terminal of the sensor capacitor is grounded.

In certain embodiments, the power converter having a feedback voltage adjusting mechanism for a negative voltage further includes an amplifier. A first input terminal of the amplifier is connected to an oscillator to receive an oscillating signal output by the oscillator. A second input terminal of the amplifier is connected to the output terminal of the error amplifier. An output terminal of the amplifier is connected to the input terminal of the control circuit.

In certain embodiments, the power converter having a feedback voltage adjusting mechanism for a negative voltage further includes a sensing amplifier and an amplifier. A first input terminal of the sensing amplifier is connected to the second terminal of the low-side switch. A second input terminal of the sensing amplifier is connected to the node between the first terminal of the low-side switch and the second terminal of the high-side switch. A first input terminal of the amplifier is connected to an output terminal of the sensing amplifier. A second input terminal of the amplifier is connected to the output terminal of the error amplifier. An output terminal of the amplifier is connected to the input terminal of the control circuit.

In certain embodiments, the power converter having a feedback voltage adjusting mechanism for a negative voltage further includes a sensing amplifier, a signal processing circuit, and an amplifier. A first input terminal of the sensing amplifier is connected to the second terminal of the low-side switch. A second input terminal of the sensing amplifier is connected to the node between the first terminal of the low-side switch and the second terminal of the high-side switch. An input terminal of the signal processing circuit is connected to an output terminal of the sensing amplifier and an oscillator. The signal processing circuit is configured to output a processing signal according to a sensing amplifier signal output by the sensing amplifier and an oscillating signal output by the oscillator. A first input terminal of the amplifier is connected to the signal processing circuit to receive the processing signal. A second input terminal of the amplifier is connected to the output terminal of the error amplifier. An output terminal of the amplifier is connected to the input terminal of the control circuit.

In certain embodiments, the signal processing circuit includes an adder.

Accordingly, the present disclosure provides a power converter having a feedback voltage adjusting mechanism for a negative voltage. The power converter includes a feedback circuit configured to sense the output voltage of the negative voltage power converter (that is, the voltage at the second terminal of the low-side switch or the voltage of the sensor capacitor) and adjust a sensed output voltage of the negative voltage power converter. Then, an adjusted output voltage is used as a feedback voltage and operations of the high-side switch and the low-side switch are controlled according to the feedback voltage, so that the ratio of the output voltage (i.e., the feedback voltage) of the negative voltage power converter of the present disclosure used for the over-voltage and under-voltage protection to the reference voltage can be maintained at a fixed ratio. Therefore, the control complexity of the over-voltage and under-voltage protection of the negative voltage power converter of the present disclosure is relatively low.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
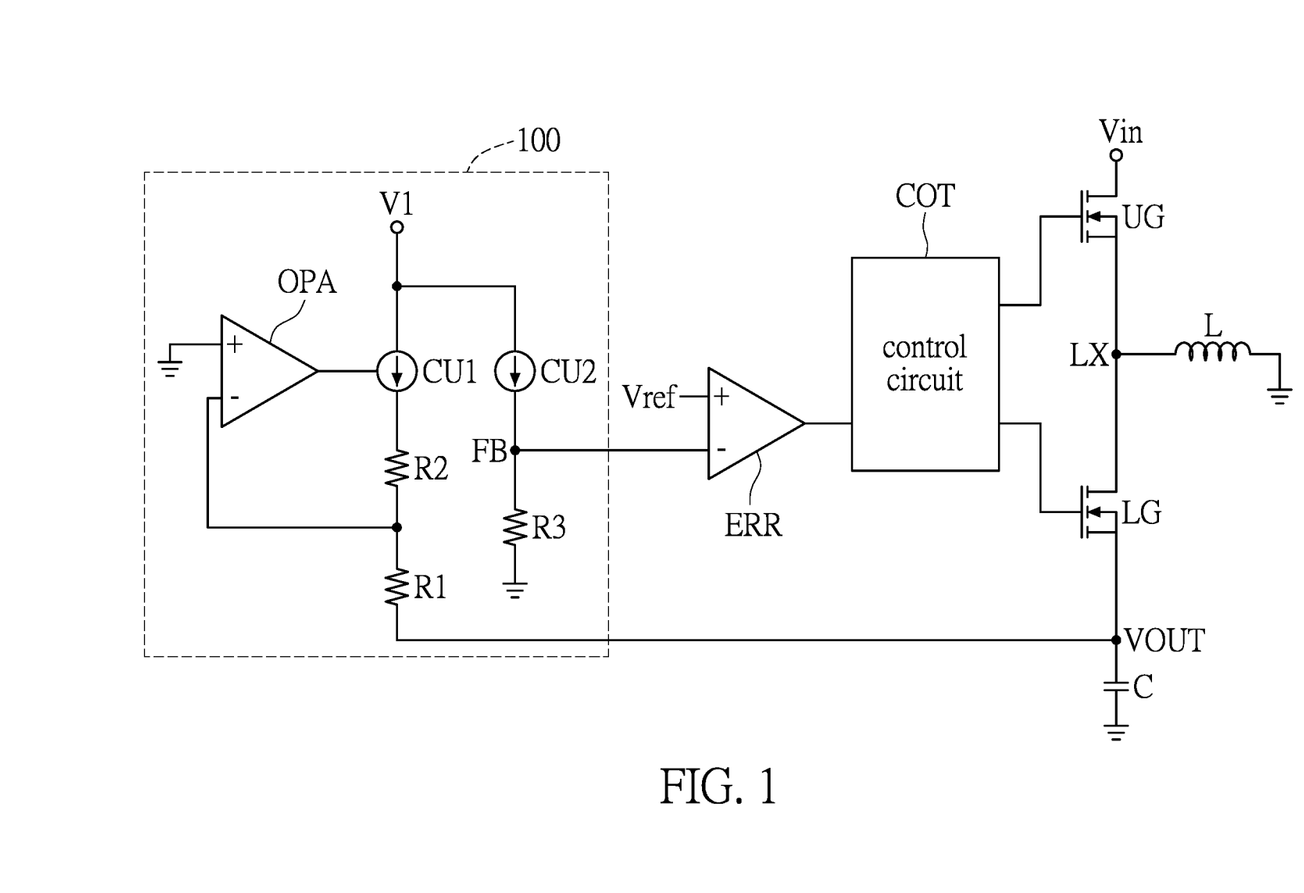
FIG. 1 is a schematic circuit diagram of a power converter having a feedback voltage adjusting mechanism for a negative voltage according to a first embodiment of the present disclosure.

Reference is made to FIG. 1, which is a circuit diagram of a power converter having a feedback voltage adjusting mechanism for a negative voltage according to a first embodiment of the present disclosure.

A power converter having a feedback voltage adjusting mechanism for a negative voltage provided by embodiments of the present disclosure may include a high-side switch UG, a low-side switch LG, a control circuit COT, an error amplifier ERR, a feedback circuit 100, and an inductance L. If necessary, the negative voltage power converter of the present disclosure may further include a sensor capacitor C.

A first terminal of the high-side switch UG is connected to a common voltage Vin. A first terminal of the low-side switch LG is connected to a second terminal of the high-side switch UG. A node between the first terminal of the low-side switch LG and the second terminal of the high-side switch UG is grounded through the inductance L. The control circuit COT is connected to a control terminal of the high-side switch UG and a control terminal of the low-side switch LG.

A second terminal of the low-side switch LG is grounded (through the sensor capacitor C). A first terminal of the sensor capacitor C is connected to the second terminal of the low-side switch LG. A second terminal of the sensor capacitor C is grounded. An input terminal of the feedback circuit 100 is connected to the second terminal of the low-side switch LG (and the first terminal of the sensor capacitor C).

A first input terminal of the error amplifier ERR, such as a non-inverting input terminal, is coupled to a reference voltage Vref. The output terminal of the feedback circuit 100 is connected to a second input terminal of the error amplifier ERR. An output terminal of the error amplifier ERR is connected to an input terminal of the control circuit COT.

It should be noted that the feedback circuit 100 may include an operational amplifier OPA, a first resistor R1, a second resistor R2, a third resistor R3, and a feedback modulation element. For example, the feedback modulation element includes a first current source CU1 and a second current source CU2. The aforementioned descriptions are provided as examples, and the present disclosure is not limited thereto.

A first input terminal of the operational amplifier OPA, such as a non-inverting input terminal, is coupled to an input voltage, such as a zero voltage. A second input terminal of the operational amplifier OPA, such as an inverting input terminal, is connected to a first terminal of the first resistor R1. A second terminal of the first resistor R1 is connected to the second terminal of the low-side switch LG (and the first terminal of the sensor capacitor C).

The first current source CU1 is connected to an output terminal of the operational amplifier OPA, and can be coupled to a first voltage V1. The second current source CU2 is connected to the first current source CU1, and can be coupled to the first voltage V1.

A first terminal of the second resistor R2 is connected to the first current source CU1. A second terminal of the second resistor R2 is connected to the first terminal of the first resistor R1. A first terminal of the third resistor R3 is connected to the second current source CU2. A second terminal of the third resistor R3 is grounded. The second input terminal of the error amplifier ERR, such as an inverting input terminal, can be connected to the first terminal of the third resistor R3.

For example, the feedback modulation element can be a current amplifier, an input current of the current amplifier is a current of the first current source CU1, and an output current of the current amplifier is a current of the second current source CU2. The description herein is provided as an example, and the present disclosure is not limited thereto.

The operational amplifier OPA multiplies a difference between a voltage (for example, a zero voltage) of the first input terminal of the operational amplifier OPA (for example, a non-inverting input terminal) and a voltage at the first terminal of the first resistor R1 by a gain to output an operational amplification signal to the first current source CU1 to control a first current of the first current source CU1 output to the second resistor R2.

It should be noted that the second current source CU2 outputs a second current to the third resistor R3, and the second current output by the second current source CU2 is m times the first current output by the first current source CU1, in which m is a numerical value greater than or equal to 1. A voltage of the third resistor R3 is used as a feedback voltage FB, and the feedback voltage FB is input to the second input terminal of the error amplifier ERR, such as an inverting input terminal.

It should be understood that the voltage of the first input terminal of the operational amplifier OPA is the same as the voltage of the second input terminal of the operational amplifier OPA. Therefore, when the input voltage coupled to the first input terminal of the operational amplifier OPA (for example, a non-inverting input terminal) is a zero voltage, the voltage at the first terminal of the first resistor R1 connected to the second input terminal of the operational amplifier OPA (for example, an inverting input terminal) is also a zero voltage. In this case, the first current of the first current source CU1 and the feedback voltage FB are expressed as:

$$I1 = (0 - \text{V}OUT)/R1,$$

$$FB = m|\text{V}OUT| \times R3/R1 = \text{V}ref,$$

in which I1 represents the first current of the first current source CU1, VOUT represents the output voltage of the negative voltage power converter (that is, the voltage at the second terminal of the low-side switch LG or the voltage at the first terminal of the sensor capacitor C), FB represents the feedback voltage of the output voltage of the negative voltage power converter (that is, the voltage of the third resistor R3), m represents that the second current of the second current source CU2 is a multiple of the first current of the first current source CU1, R3 represents the resistance value of the third resistor, R1 represents the resistance value of the first resistor, and Vref represents the reference voltage.

For example, the protection voltage of the under-voltage protection setting can be expressed as: UVP=0.75 VOUT=>UVPFB=m|0.75×VOUT|×R3/R1=0.75 Vref, in which UVP represents the protection voltage of the output voltage of the negative voltage power converter of the under-voltage protection setting (that is, the voltage at the second terminal of the low-side switch LG or the voltage at the first terminal of the sensor capacitor C), VOUT represents the output voltage of the negative voltage power converter (that is, the voltage at the second terminal of the low-side switch LG or the voltage at the first terminal of the sensor capacitor C), UVPFB represents the protection voltage of the feedback voltage FB set under the under-voltage protection, m represents that the second current of the second current source CU2 is a multiple of the first current of the first current source CU1, R3 represents the resistance value of the third resistor, R1 represents the resistance value of the first resistor, and Vref represents the reference voltage.

The error amplifier ERR multiplies a difference between the feedback voltage FB converted by the second current of the second current source CU2 (for example, the voltage of the third resistor R3 or the voltage replaced by a capacitor in practice) and the reference voltage Vref by a gain to output an error amplification signal.

The control circuit COT can control the operation of the high-side switch UG and the low-side switch LG according to the error amplification signal received from the error amplifier ERR so as to further control a node voltage LX between the second terminal of the high-side switch UG and the first terminal of the low-side switch LG, and control an output voltage VOUT of the negative voltage power converter (that is, the voltage at the second terminal of the low-side switch LG or the voltage of the sensor capacitor C).

The output voltage VOUT of the negative voltage power converter (that is, the voltage at the second terminal of the low-side switch LG or the voltage at the first terminal of the sensor capacitor C) is adjusted by the feedback circuit 100 to form the feedback voltage FB (that is, the voltage of the resistor R3), and the feedback voltage FB is input to the second input terminal of the error amplifier ERR, such as an inverting input terminal.

As a result, the ratio of the output voltage VOUT or the feedback voltage FB (the protection voltage) of the negative voltage power converter of the present disclosure to the reference voltage Vref is a fixed ratio. For example, the protection voltage of the feedback voltage FB is fixed at 0.75 times the reference voltage Vref, but it is not limited thereto.

Figure 2:
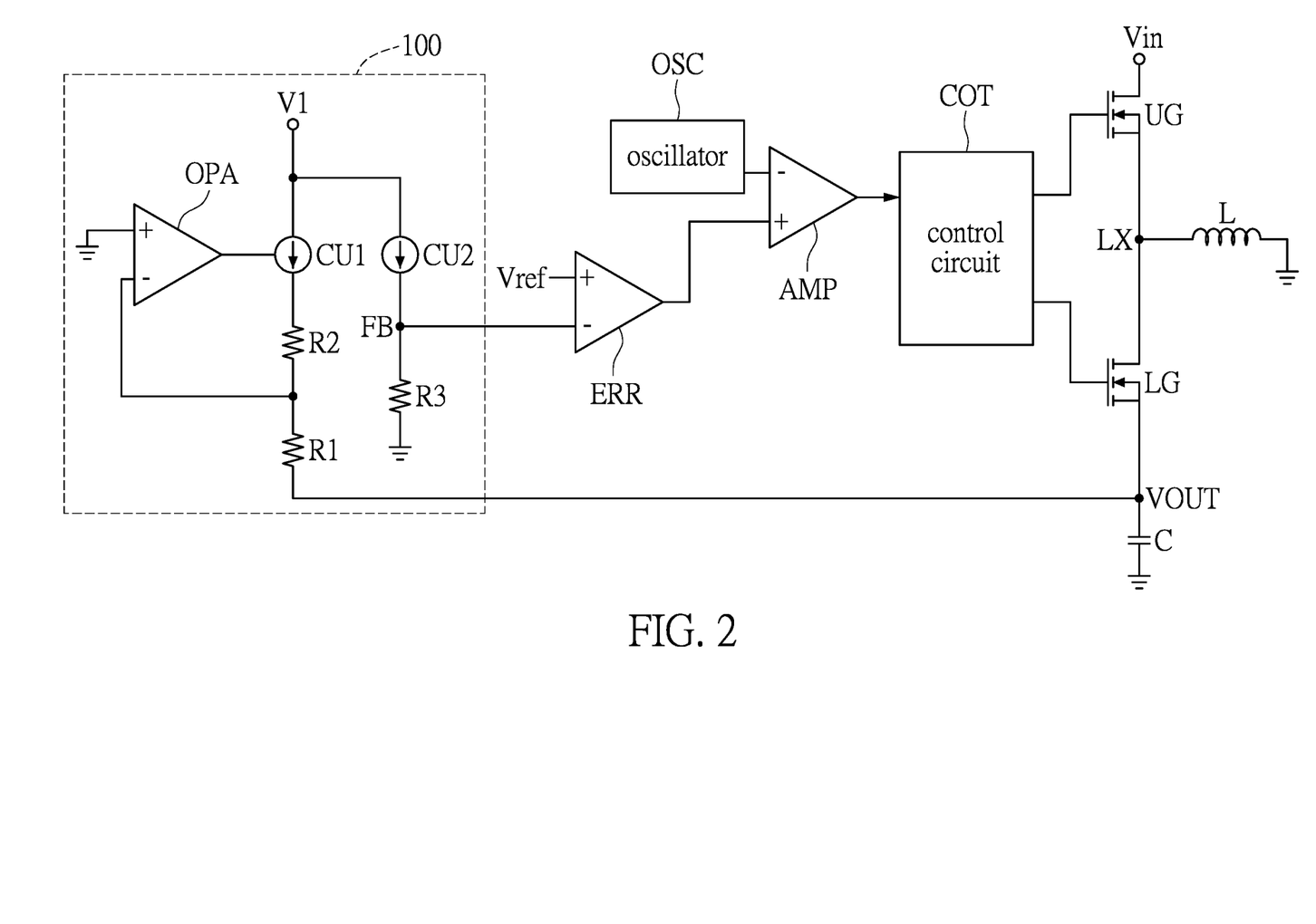
FIG. 2 is a schematic circuit diagram of a power converter having a feedback voltage adjusting mechanism for a negative voltage according to a second embodiment of the present disclosure.

Reference is made to FIG. 2, which refers to a circuit diagram of a power converter having a feedback voltage adjusting mechanism for a negative voltage according to the second embodiment of the present disclosure. The similarities between the second embodiment and the first embodiment are not repeated herein.

The difference between the second embodiment and the first embodiment is that the negative voltage power converter of the second embodiment further includes an amplifier AMP.

A first input terminal of the amplifier AMP, such as an inverting input terminal, is connected to an output terminal of an oscillator OSC. A second input terminal of the amplifier AMP, such as a non-inverting input terminal, is connected to the output terminal of the error amplifier ERR. An output terminal of the amplifier AMP is connected to the input terminal of the control circuit COT.

Firstly, the feedback circuit 100 senses the output voltage VOUT of the negative voltage power converter (that is, the voltage at the second terminal of the low-side switch LG or the voltage of the sensor capacitor C) and adjusts a sensed output voltage VOUT of the negative voltage power converter. An adjusted voltage is used as the feedback voltage FB and the feedback voltage FB is input to the second input terminal of the error amplifier ERR, such as an inverting input terminal. The error amplifier ERR multiplies a difference between the feedback voltage FB received from the feedback circuit 100 and the reference voltage Vref by a gain to output the error amplification signal.

The amplifier AMP outputs an amplification signal according to the error amplification signal received from the error amplifier ERR and an oscillating signal received from the oscillator OSC.

The control circuit COT can control the operation of the high-side switch UG and the low-side switch LG according to the amplification signal received from the amplifier AMP, so as to control a node voltage LX between the second terminal of the high-side switch UG and the first terminal of the low-side switch LG, and control the output voltage VOUT of the negative voltage power converter (that is, the voltage at the second terminal of the low-side switch LG or the voltage of the sensor capacitor C).

As a result, the ratio of the output voltage VOUT or the feedback voltage FB (the protection voltage) of the negative voltage power converter of the present disclosure to the reference voltage Vref is a fixed ratio.

Figure 3:
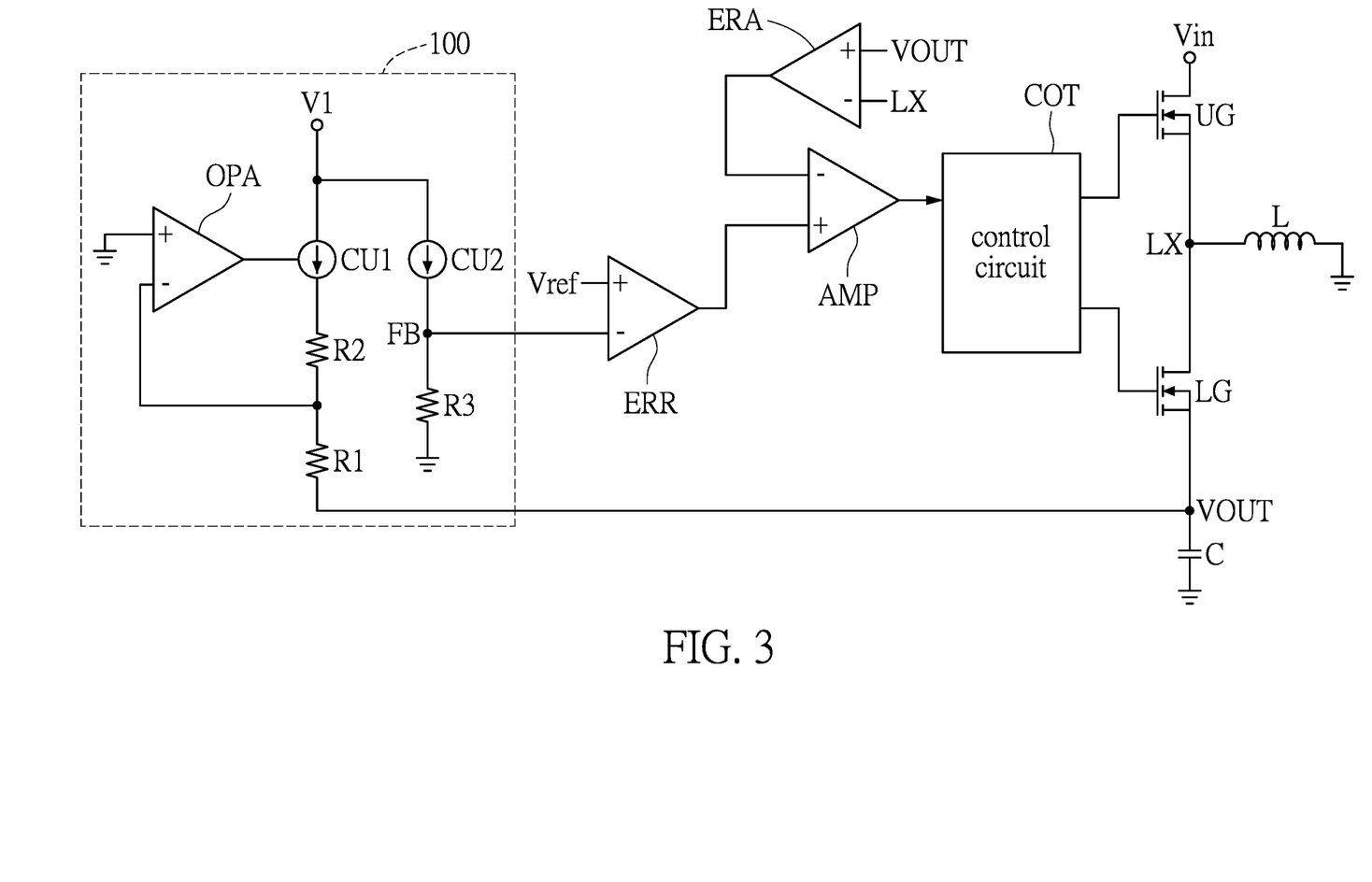
FIG. 3 is a schematic circuit diagram of a power converter having a feedback voltage adjusting mechanism for a negative voltage according to a third embodiment of the present disclosure.

Reference is made to FIG. 3, which refers to a circuit diagram of a power converter having a feedback voltage adjusting mechanism for a negative voltage according to the third embodiment of the present disclosure. The similarities between the third embodiment and the first embodiment are not repeated herein.

The difference between the third embodiment and the first embodiment is that the negative voltage power converter of the third embodiment further includes the amplifier AMP and a sensing amplifier ERA.

A first input terminal of the sensing amplifier ERA, such as a non-inverting input terminal, is connected to the second terminal of the low-side switch LG (and the first terminal of the sensor capacitor C) to receive the output voltage VOUT. A second input terminal of the sensing amplifier ERA, such as an inverting input terminal, is connected to a node between the second terminal of the high-side switch UG and the first terminal of the low-side switch LG to receive the node voltage LX.

The first input terminal of the amplifier AMP, such as an inverting input terminal, is connected to an output terminal of the sensing amplifier ERA. The second input terminal of the amplifier AMP, such as a non-inverting input terminal, is connected to an output terminal of the error amplifier ERR. The output terminal of the amplifier AMP is connected to the input terminal of the control circuit COT.

Firstly, the feedback circuit 100 senses the output voltage VOUT of the negative voltage power converter (that is, the voltage at the second terminal of the low-side switch LG or the voltage of the sensor capacitor C) and adjusts a sensed output voltage VOUT of the negative voltage power converter. An adjusted voltage is used as the feedback voltage FB and the feedback voltage FB is input to the second input terminal of the error amplifier ERR, such as an inverting input terminal. The error amplifier ERR multiplies a difference between the feedback voltage FB received from the feedback circuit 100 and the reference voltage Vref by a gain to output an error amplification signal.

The sensing amplifier ERA multiples a difference between the output voltage VOUT received from the second terminal of the low-side switch LG or from the first terminal of the sensor capacitor C, and the node voltage LX between the second terminal of the high-side switch UG and the first terminal of the low-side switch LG by a gain to output a sensing amplification signal.

Next, the amplifier AMP outputs an amplification signal according to the sensing amplification signal received from the sensing amplifier ERA and the error amplification signal received from the error amplifier ERR.

The control circuit COT can control the operation of the high-side switch UG and the low-side switch LG according to the amplification signal received from the amplifier AMP, so as to control a node voltage LX between the second terminal of the high-side switch UG and the first terminal of the low-side switch LG, and control the output voltage VOUT of the negative voltage power converter (that is, the voltage at the second terminal of the low-side switch LG or the voltage of the sensor capacitor C).

As a result, the ratio of the output voltage VOUT or the feedback voltage FB (the protection voltage) of the negative voltage power converter of the present disclosure to the reference voltage Vref is a fixed ratio.

Figure 4:
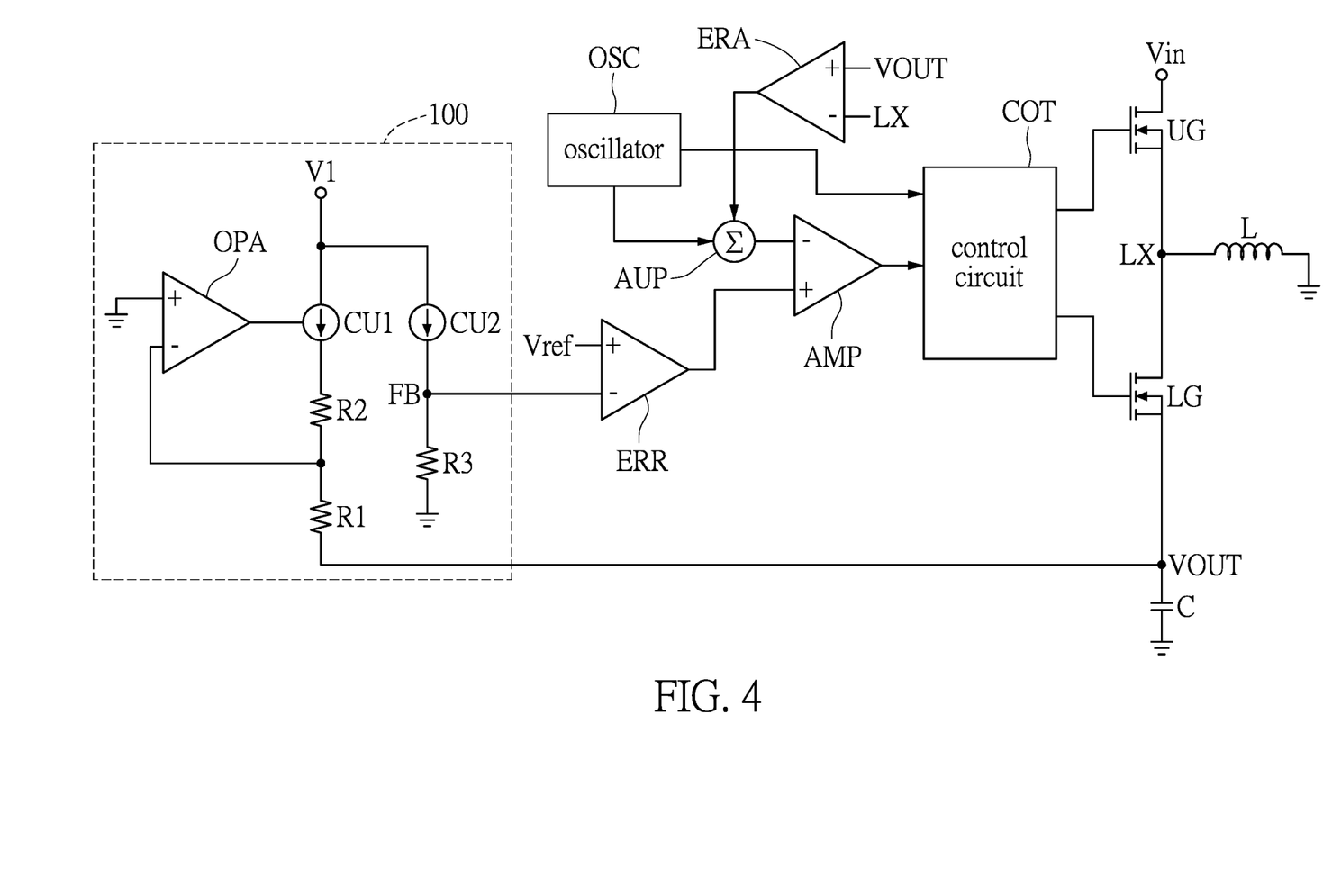
FIG. 4 is a schematic circuit diagram of a power converter having a feedback voltage adjusting mechanism for a negative voltage according to a fourth embodiment of the present disclosure.

Reference is made to FIG. 4, which refers to a circuit diagram of a power converter having a feedback voltage adjusting mechanism for a negative voltage according to the fourth embodiment of the present disclosure. The similarities between the fourth embodiment and the first embodiment are not repeated herein.

The difference between the fourth embodiment and the first embodiment is that the negative voltage power converter of the fourth embodiment further includes the amplifier AMP, the sensing amplifier ERA and a signal processing circuit AUP.

The first input terminal of the sensing amplifier ERA, such as a non-inverting input terminal, is connected to the second terminal of the low-side switch LG (and the first terminal of the sensor capacitor C) to receive the output voltage VOUT. The second input terminal of the sensing amplifier ERA, such as an inverting input terminal, is connected to the node between the second terminal of the high-side switch UG and the first terminal of the low-side switch LG to receive the node voltage LX.

An input terminal of the signal processing circuit AUP is connected to the output terminal of the sensing amplifier ERA and the output terminal of the oscillator OSC.

The first input terminal of the amplifier AMP, such as an inverting input terminal, is connected to an output terminal of the signal processing circuit AUP. The second input terminal of the amplifier AMP, such as a non-inverting input terminal, is connected to the output terminal of the error amplifier ERR. The output terminal of the amplifier AMP is connected to the input terminal of the control circuit COT.

Firstly, the feedback circuit 100 senses the output voltage VOUT of the negative voltage power converter (that is, the voltage at the second terminal of the low-side switch LG or the voltage of the sensor capacitor C) and adjusts a sensed output voltage VOUT of the negative voltage power converter. An adjusted voltage is used as the feedback voltage FB and the feedback voltage FB is input to the second input terminal of the error amplifier ERR, such as an inverting input terminal. The error amplifier ERR multiplies a difference between the feedback voltage FB received from the feedback circuit 100 and the reference voltage Vref by a gain to output an error amplification signal.

The sensing amplifier ERA multiples a difference between the output voltage VOUT received from the second terminal of the low-side switch LG or from the first terminal of the sensor capacitor C, and the node voltage LX between the second terminal of the high-side switch UG and the first terminal of the low-side switch LG by a gain to output a sensing amplification signal.

The signal processing circuit AUP may include an adder or other arithmetic operators configured to perform arithmetic operations on the sensing amplification signal received from the sensing amplifier ERA and the oscillating signal output from the oscillator OSC to output a processing signal.

The amplifier AMP can output an amplification signal according to the processing signal received from the signal processing circuit AUP and the error amplification signal received from the error amplifier ERR.

The control circuit COT can control the operation of the high-side switch UG and the low-side switch LG according to the amplification signal received from the amplifier AMP, so as to control a node voltage LX between the second terminal of the high-side switch UG and the first terminal of the low-side switch LG, and control the output voltage VOUT of the negative voltage power converter (that is, the voltage at the second terminal of the low-side switch LG or the voltage of the sensor capacitor C).

As a result, the ratio of the output voltage (the feedback voltage) of the negative voltage power converter of the present disclosure to the reference voltage Vref is a fixed ratio.

Figure 5:
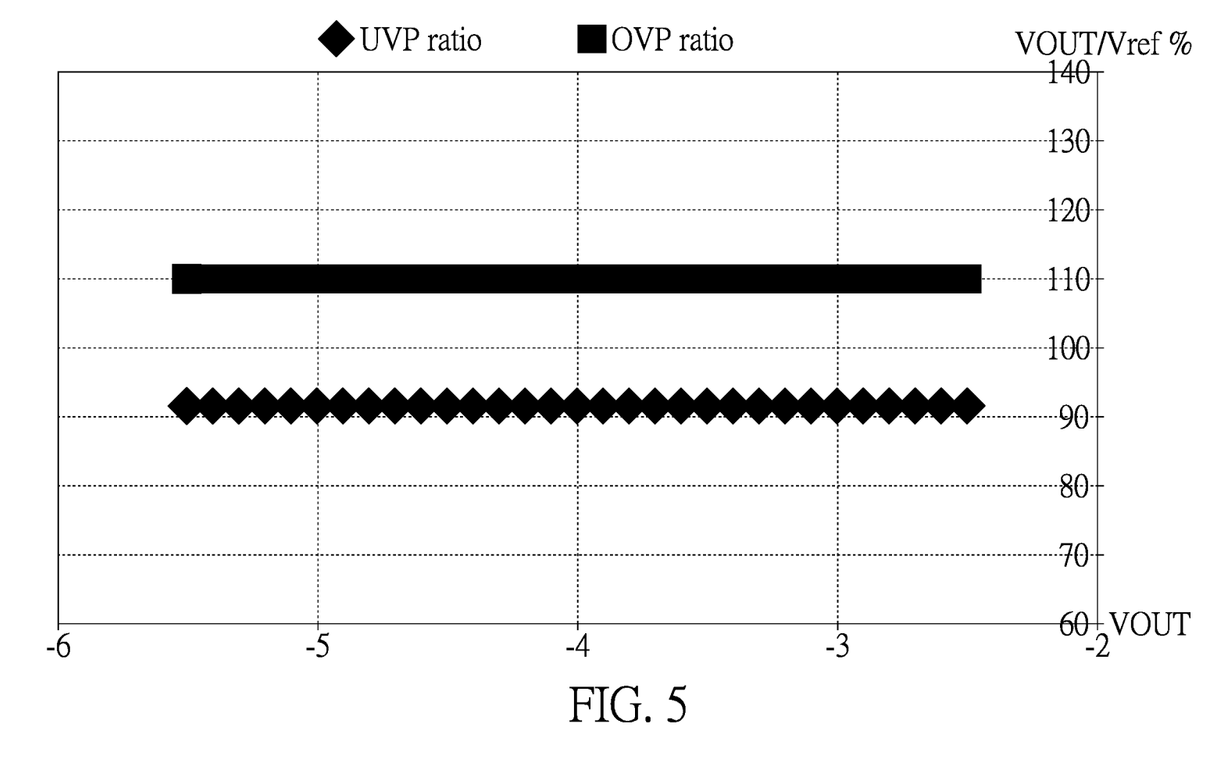
FIG. 5 is a waveform diagram of signals of the power converters according to the first embodiment to the fourth embodiment of the present disclosure.
Figure 6:
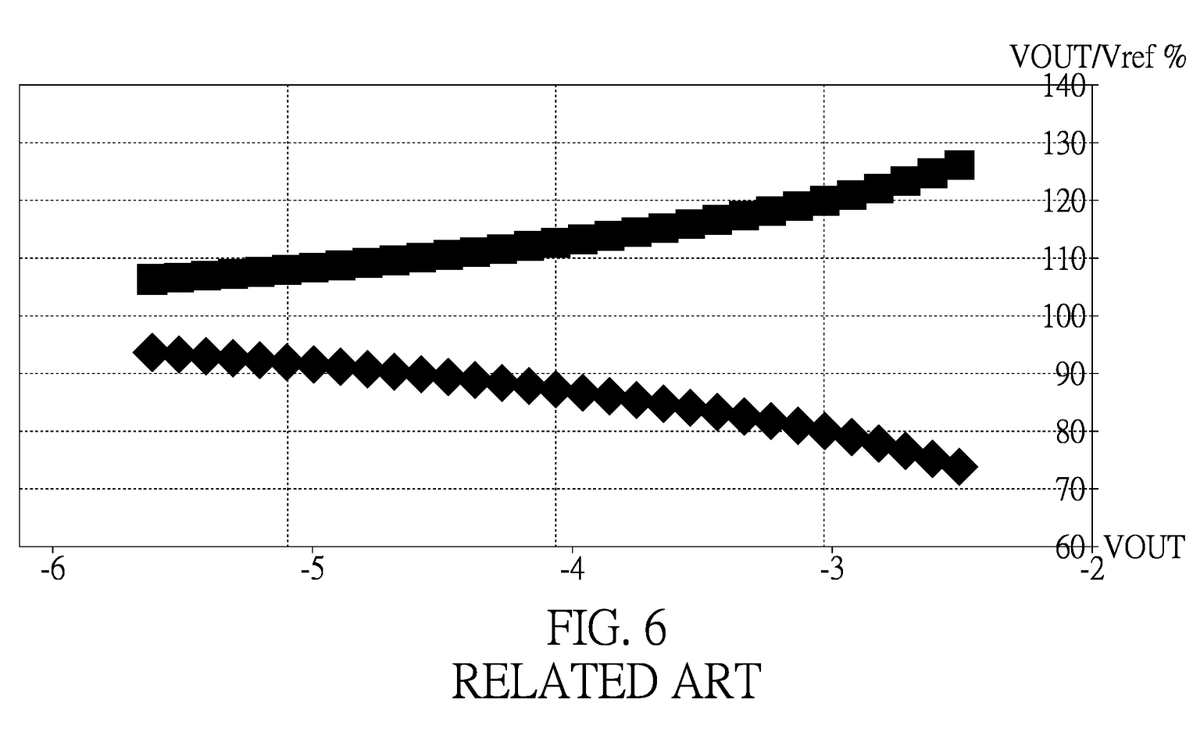
FIG. 6 is a waveform diagram of signals of a conventional negative voltage power converter.

Reference is made to FIG. 1 to FIG. 6, in which FIG. 5 is a waveform diagram of signals of a power converter having a feedback voltage adjusting mechanism for a negative voltage according to the first embodiment to the fourth embodiment of the present disclosure, and FIG. 6 is a waveform diagram of signals of a conventional negative voltage power converter.

As shown in FIG. 6, the output voltage VOUT of the conventional negative voltage power converter is controlled by the reference voltage Vref, but the ratio of the over-voltage and under-voltage protection is not a fixed ratio, and will vary with the change of the output voltage VOUT of the conventional negative voltage power converter.

As shown in FIG. 5, the ratio of the over-voltage and under-voltage protection of the negative voltage power converter of the present disclosure to the reference voltage Vref can be maintained at a fixed ratio, and is not changed with the change of the output voltage VOUT of the negative voltage power converter of the present disclosure. Therefore, the control complexity of the over-voltage and under-voltage protection of the negative voltage power converter of the present disclosure is relatively lower.

For example, in the under-voltage protection (UVP) mode, regardless of a voltage magnitude of the output voltage VOUT of the negative voltage power converter of the present disclosure, the ratio of the under-voltage protection voltage of the negative voltage power converter of the present disclosure to the output voltage VOUT and the ratio of the under-voltage protection designed to the reference voltage Vref are both a fixed ratio. For example, the fixed ratio as shown in FIG. 5 is 110%.

For example, in the over-voltage protection (OVP) mode, regardless of a voltage magnitude of the output voltage VOUT of the negative voltage power converter of the present disclosure, the ratio of the over-voltage protection voltage of the negative voltage power converter of the present disclosure to the output voltage VOUT, and the ratio of the over-voltage protection designed to the reference voltage Vref are both a fixed ratio. For example, the fixed ratio as shown in FIG. 5 is 90%.

In conclusion, the present disclosure provides a power converter having a feedback voltage adjusting mechanism for a negative voltage. The power converter includes a feedback circuit configured to sense the output voltage of the negative voltage power converter (that is, the voltage at the second terminal of the low-side switch or the voltage of the sensor capacitor) and adjust a sensed output voltage of the negative voltage power converter. Then, an adjusted output voltage is used as a feedback voltage and the operation of the high-side switch and the low-side switch is controlled according to the feedback voltage, so that the ratio of the output voltage (the feedback voltage) of the negative voltage power converter of the present disclosure used for the over-voltage and under-voltage protection to the reference voltage can be maintained at a fixed ratio. Therefore, the control complexity of the over-voltage and under-voltage protection of the negative voltage power converter of the present disclosure is relatively lower.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a feedback voltage adjusting mechanism for a negative voltage, comprising:
   a high-side switch, wherein a first terminal of the high-side switch is connected to a common voltage;
   a low-side switch, wherein a first terminal of the low-side switch is connected to a second terminal of the high-side switch, a node between the first terminal of the low-side switch and the second terminal of the high-side switch is grounded through an inductance, and a second terminal of the low-side switch is grounded;

a control circuit connected to a control terminal of the high-side switch and a control terminal of the low-side switch;
an error amplifier, wherein a first input terminal of the error amplifier is coupled to a reference voltage, and an output terminal of the error amplifier is connected to an input terminal of the control circuit; and
a feedback circuit, including:
an operational amplifier, wherein a first input terminal of the operational amplifier is coupled to an input voltage;
a first resistor, wherein a first terminal of the first resistor is connected to a second input terminal of the operational amplifier, and a second terminal of the first resistor is connected to the second terminal of the low-side switch;
a feedback modulation element connected to an output terminal of the operational amplifier and configured to determine a value of a first current according to an operational amplification signal output by the operational amplifier and output the first current, and configured to output a second current, wherein a value of the second current is m times the value of the first current, and m depends on a fixed ratio of the reference voltage to an output voltage;
a second resistor, wherein a first terminal of the second resistor is connected to the feedback modulation element to receive the first current, and a second terminal of the second resistor is connected to the first terminal of the first resistor; and
a third resistor, wherein a first terminal of the third resistor is connected to the feedback modulation element to receive the second current and connected to a second input terminal of the error amplifier, and a second terminal of the third resistor is grounded.

2. The power converter according to claim 1, wherein the input voltage is a zero voltage.

3. The power converter according to claim 1, wherein the feedback modulation element includes:
a first current source connected to the output terminal of the operational amplifier and the first terminal of the second resistor, and configured to output the first current to the second resistor according to the operational amplification signal; and
a second current source connected to the first current source and the first terminal of the third resistor, wherein the second current source outputs the second current m times the first current to the third resistor.

4. The power converter according to claim 3, wherein the first current source is coupled to a first voltage.

5. The power converter according to claim 3, wherein the second current source is coupled to a first voltage.

6. The power converter according to claim 1, further comprising:

a sensor capacitor, wherein a first terminal of the sensor capacitor is connected to the second terminal of the low-side switch and the second terminal of the first resistor, and a second terminal of the sensor capacitor is grounded.

7. The power converter according to claim 1, further comprising:
an amplifier, wherein a first input terminal of the amplifier is connected to an oscillator to receive an oscillating signal output by the oscillator, and a second input terminal of the amplifier is connected to the output terminal of the error amplifier, and an output terminal of the amplifier is connected to the input terminal of the control circuit.

8. The power converter according to claim 1, further comprising:
a sensing amplifier, wherein a first input terminal of the sensing amplifier is connected to the second terminal of the low-side switch, and a second input terminal of the sensing amplifier is connected to the node between the first terminal of the low-side switch and the second terminal of the high-side switch; and
an amplifier, wherein a first input terminal of the amplifier is connected to an output terminal of the sensing amplifier, a second input terminal of the amplifier is connected to the output terminal of the error amplifier, and an output terminal of the amplifier is connected to the input terminal of the control circuit.

9. The power converter according to claim 1, further comprising:
a sensing amplifier, wherein a first input terminal of the sensing amplifier is connected to the second terminal of the low-side switch, and a second input terminal of the sensing amplifier is connected to the node between the first terminal of the low-side switch and the second terminal of the high-side switch;
a signal processing circuit, wherein an input terminal of the signal processing circuit is connected to an output terminal of the sensing amplifier and an oscillator, and the signal processing circuit is configured to output a processing signal according to a sensing amplifier signal output by the sensing amplifier and an oscillating signal output by the oscillator; and
an amplifier, wherein a first input terminal of the amplifier is connected to the signal processing circuit to receive the processing signal, a second input terminal of the amplifier is connected to the output terminal of the error amplifier, and an output terminal of the amplifier is connected to the input terminal of the control circuit.

10. The power converter according to claim 9, wherein the signal processing circuit includes an adder.

* * * * *